Jan. 7, 1930.  E. G. TEMPLETON  1,743,066
COLLAPSIBLE CHUCK
Filed Sept. 17, 1927

Inventor
Edwin G. Templeton

Attorney

Patented Jan. 7, 1930

1,743,066

UNITED STATES PATENT OFFICE

EDWIN G. TEMPLETON, OF AKRON, OHIO, ASSIGNOR TO THE GOODYEAR TIRE & RUBBER COMPANY, OF AKRON, OHIO, A CORPORATION OF OHIO

COLLAPSIBLE CHUCK

Application filed September 17, 1927. Serial No. 220,206.

My invention relates to collapsible chucks and it has particular relation to devices of the above designated character which shall be especially applicable to facilitate the construction of small diameter straight side tires, in which inextensible beads are employed.

It is customary in constructing tire casings to assemble several plies of material in superimposed relation upon a cylindrical drum or chuck mounted to rotate about a horizontal axis. The drum is usually of a width somewhat less than the width of the plies of material so that the edge portions of the latter extend past the edges of the drum and may be turned inwardly against the sides thereof. Endless tire beads, which are smaller in diameter than the drum are then assembled within the inwardly extending portions of the fabric plies.

When the beads are extensible in character, but slight difficulty is encountered in removing the tire from the core. When, however, inextensible beads are employed, it is necessary that the drum be collapsed to permit the removal of the tire therefrom. Although various forms of collapsible drums or cores have been devised, some of these forms do not collapse sufficiently to permit easy removal of straight side tires, especially those of small diameter, therefrom. Other forms are complicated in construction and therefore require considerable attention to maintain them in proper working condition.

One object of my invention is to provide a collapsible tire chuck which is extremely simple in construction and which may be quickly and easily manipulated from tire-supporting to collapsed condition, and vice versa.

Another object of my invention is to provide a device of the above designated character which may be collapsed sufficiently to permit ready removal of straight side tires built thereon.

A full and complete understanding of the invention may be obtained by consideration of the following detailed description in conjunction with the accompanying drawing forming a part of the disclosure. In the drawings.

Figure 1:
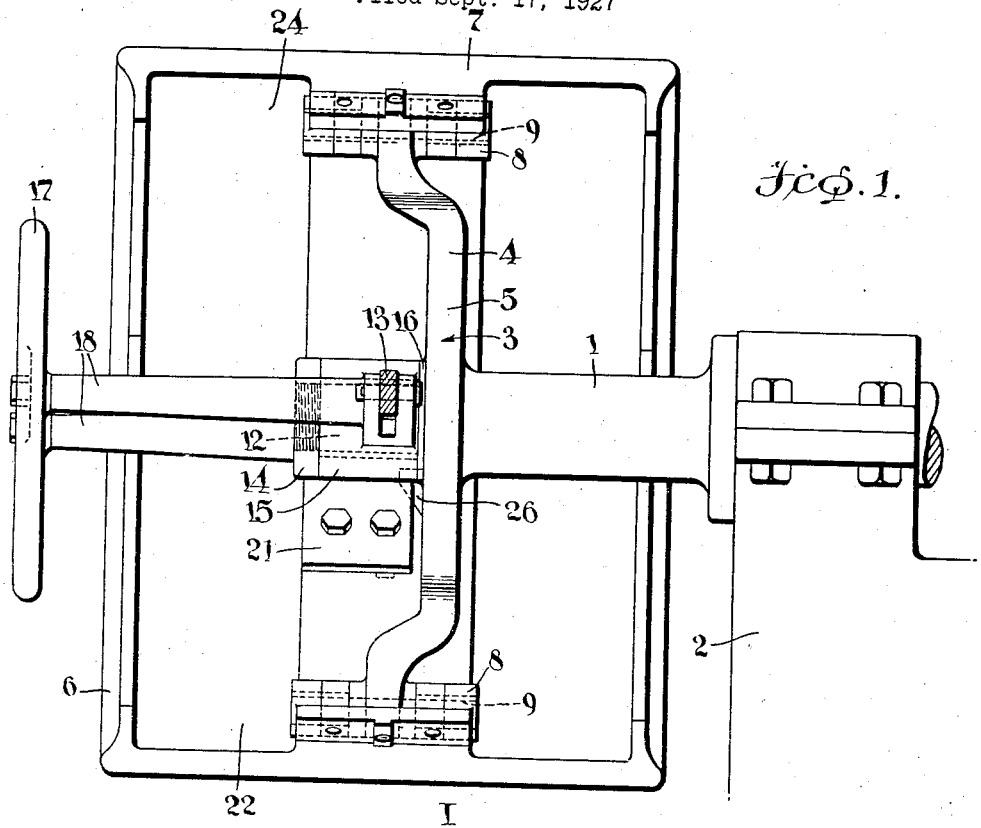
Fig. 1 is a cross-sectional view of a portion of a tire building machine embodying a collapsible chuck constructed in accordance with my invention, the section being taken substantially along line I—I of Fig. 2.

In the particular embodiment of my invention illustrated in the accompanying drawings, a shaft 1, rotatably supported and driven by any suitable mechanism, as indicated at 2, constitutes a supporting member for a tire chuck 3. An arm 4, centrally offset, as indicated at 5, is secured intermediate its ends to the shaft 1 to rotate therewith.

A drum 6, consisting of a plurality of relatively movable segments 7, is supported by the arm 4. As shown, each segment is arcuately formed and comprises approximately one fourth of the entire drum. The segments are pivotally connected to the ends of the arm 5 by means of hinge elements 8 mounted upon the segments and engaging pins 9 carried by the arm. It will be noted that the ends of the segments adjacent the hinge elements are cut off at right angles to the longitudinal axis of the segments in order that outward pivotal movement of the free ends may be limited. The free end of each segment it cut off at an angle oblique to the longitudinal axis, as indicated at 11. This construction assures that outward movement of the free end of one of the segments will cause a similar movement of the free end of the adjacent segment so that means provided for expanding the segments need operate directly upon only one segment of each pair.

An end 12 of the shaft 1 extends through the arm 5 and an arm 13 is rotatably mounted thereon. A collar member 14 threaded on the end of the shaft 1 serves to retain an enlarged central portion 15 of the arm 13 in slidable engagement with a boss 16 formed on the shaft.

A hand wheel 17 is operatively connected to the arm 13 by means of spaced arms 18, secured at their inner ends to the arm 13 at each side of the enlarged portion 15. Links 19 pivotally connect the ends of the arm 13 to hinge elements 21 secured to oppositely disposed drum segments 22 and 23 adjacent the free ends thereof. It is to be noted that the outer peripheral surfaces of these segments are shorter than the like surfaces of the other segments.

Figure 2:
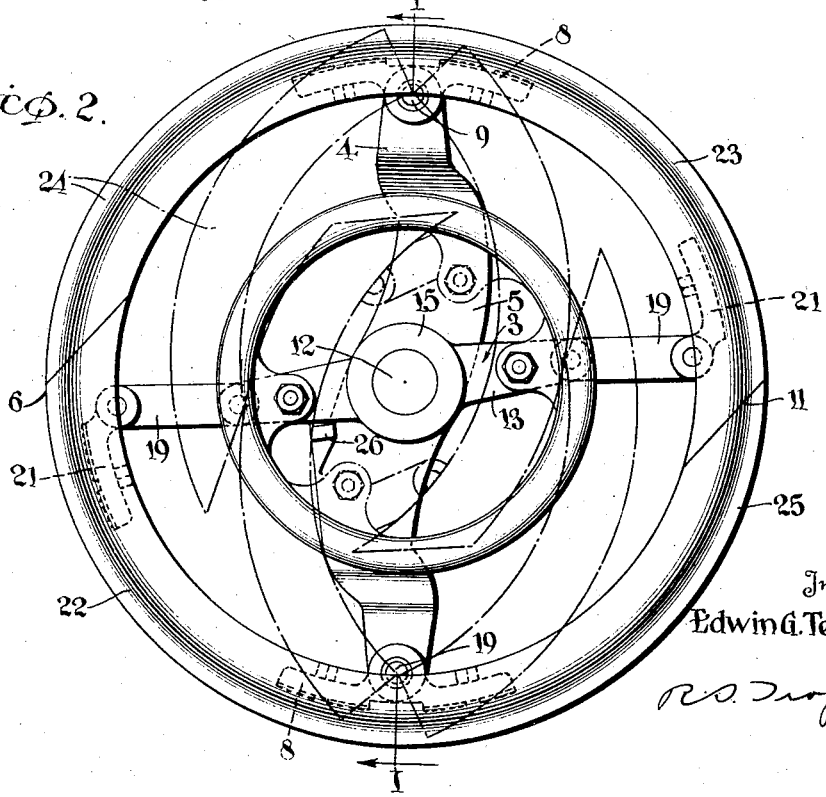
Fig. 2 is an end elevational view of the chuck shown in Fig. 1 illustrating, by dot and dash lines, the position of certain elements of the device in a collapsed condition of the chuck and illustrating hidden parts by dotted lines.

Rotation of the hand wheel 17 in a clockwise direction, as viewed in Fig. 2, causes the free ends of sections 22 and 23 to be moved inwardly toward the arm 4, which movement permits the sections 24 and 25 to be moved toward the arm also. Rotation of the hand wheel 17 in a counter-clockwise direction forces the free ends of the sections 22 and 23 outwardly and the engagement by these arms of the free ends of arms 24 and 25 forces the latter outwardly until they reach the position shown in Fig. 2. Further outward pivotal movement of all of the sections is prevented by the engagement of the ends thereof adjacent the hinges. An abutment 26 projecting from the arm 4 into the path of travel of the arm 13 serves to limit rotative movement of the latter in both directions.

Although I have illustrated only one form which my invention may assume and have described in detail but a single application thereof, it will be apparent to those skilled in the art that it is not so limited, but that various minor modifications and changes may be made therein without departing from the spirit of the invention or from the scope of the appended claims.

What I claim is:

1. A tire supporting chuck comprising a shaft, a plurality of arcuate segments, an arm secured intermediate its ends to the shaft, means pivotally connecting an end of each segment to an end of the arm and means for moving the free ends of the segments.

2. A tire supporting chuck comprising a shaft, a plurality of arcuate segments, an arm secured intermediate its ends to the shaft, means pivotally connecting the segments to the arm, and means for controlling the movement of certain of the segments.

3. A tire supporting chuck comprising a plurality of segments adapted, when placed together in end to end relation, to form a circular drum, an arm, means pivotally connecting an end of each segment to an end of the arm, and means for moving the free ends of adjacent segments into end to end relation.

4. A tire supporting chuck comprising a supporting member, an arm secured thereto intermediate its ends, a plurality of segments adapted to form a circular drum, means pivotally connecting an end of each segment to an end of the arm, a shorter arm rotatably mounted intermediate its ends on the supporting member, and means pivotally connecting the free ends of the shorter arm to points adjacent the free ends of certain of the segments.

5. A tire supporting chuck comprising a supporting member, an arm secured thereto intermediate its ends, a plurality of segments adapted to form a circular drum, means pivotally connecting an end of each segment to an end of the arm, a shorter arm rotatably mounted intermediate its ends on the supporting member, means pivotally connecting the free ends of the shorter arm to points adjacent the free ends of certain of the segments and means for rotating the shorter arm.

6. A tire supporting chuck comprising a supporting member, an arm secured thereto intermediate its ends, a plurality of segments adapted to form a circular drum, means pivotally connecting an end of each segment to an end of the arm, a shorter arm rotatably mounted intermediate its ends on the supporting member, links pivotally connecting the free ends of the shorter arm to points adjacent the free ends of certain of the segments and means for rotating the shorter arm.

7. A tire supporting chuck comprising a supporting member, an arm secured thereto intermediate its ends, a plurality of segments adapted to form a circular drum, means pivotally connecting an end of each segment to an end of the arm and a double toggle linkage controlling movement of certain of the segments.

8. A tire supporting chuck comprising a supporting member, an arm secured thereto intermediate its ends, a plurality of segments adapted to form a circular drum, means pivotally connecting an end of each segment to an end of the arm, a shorter arm rotatably mounted intermediate its ends on the supporting member and means pivotally connecting an end of the shorter arm to one of the segments.

9. A tire supporting chuck comprising a supporting member, an arm secured thereto intermediate its ends, pairs of arcuate segments, a pivotal connection between a single end of each segment and an end of the arm, the segments being disposed to form a complete circle, and means for moving the free ends of the arcuate segments.

10. A tire supporting chuck comprising a supporting member, an arm secured thereto intermediate its ends, pairs of arcuate segments, each segment having a pivotal connection adjacent a single end thereof to an end of the arm, the segments being disposed to form a complete circle, a shorter arm rotatably mounted intermediate its ends on the supporting member, and means pivotally connecting an end of the shorter arm to a point adjacent the free end of one of the segments.

11. A tire supporting chuck comprising a supporting member, an arm secured thereto intermediate its ends, pairs of arcuate segments, each segment having a pivotal connection adjacent a single end thereof to an end of the arm, the segments being so disposed as to form a complete circle, a shorter arm rotatably mounted intermediate its ends on the supporting member, and means pivotally connecting each end of the shorter arm to a point adjacent the free end of one of the segments.

12. A tire supporting chuck comprising a supporting member, an arm secured thereto intermediate its ends, pairs of arcuate segments, each segment having a pivotal connection adjacent a single end thereof to an end of the arm, the segments being so disposed as to form a complete circle, a shorter arm rotatably mounted intermediate its ends on the supporting member, means pivotally connecting each end of the shorter arm to a point adjacent the free end of one of the segments and means for rotating the shorter arm.

13. A tire supporting chuck comprising a supporting member, an arm secured thereto intermediate its ends, pairs of segments pivotally connected adjacent their ends to the respective ends of the arm and means for controlling movement of one section of each pair.

14. A tire supporting chuck comprising a supporting member, an arm secured thereto intermediate its ends, pairs of segments pivotally connected adjacent their ends to the respective ends of the arm and a double toggle linkage for controlling movement of one segment of each pair.

In witness whereof, I have hereunto signed my name.

Signed at Akron, in the county of Summit, and State of Ohio, this 16th day of September, 1927.

EDWIN G. TEMPLETON.